(12) United States Patent
Johnson et al.

(10) Patent No.: US 8,291,927 B2
(45) Date of Patent: Oct. 23, 2012

(54) REMANUFACTURED MACHINE COMPONENT AND VALVE BODY REMANUFACTURING PROCESS

(75) Inventors: Kirk Johnson, Rainbow City, AL (US); Gary Harris, Anniston, AL (US); Alberto F. Garcia, Tamaulipas (MX)

(73) Assignee: Caterpillar Inc., Peoria, IL (US)

( * ) Notice: Subject to any disclaimer, the term of this patent is extended or adjusted under 35 U.S.C. 154(b) by 1245 days.

(21) Appl. No.: 12/072,892

(22) Filed: Feb. 28, 2008

(65) Prior Publication Data

US 2009/0217523 A1      Sep. 3, 2009

(51) Int. Cl.
*B23P 6/00* (2006.01)
*F16K 1/42* (2006.01)

(52) U.S. Cl. ............ 137/15.18; 137/315.01; 29/888.42; 29/888.44; 29/890.121; 29/890.122; 251/359

(58) Field of Classification Search ............... 137/15.17, 137/15.08, 315.01, 315.07, 315.27, 15.18; 251/359; 29/890.121, 890.124, 890.122, 29/888.41, 888.42, 888.44
See application file for complete search history.

(56) References Cited

U.S. PATENT DOCUMENTS

| | | | | |
|---|---|---|---|---|
| 1,733,421 | A * | 10/1929 | Mauran | 251/360 |
| 1,829,059 | A * | 10/1931 | Prestek | 451/440 |
| 2,034,829 | A * | 3/1936 | O'Malley | 29/890.121 |
| 2,044,950 | A * | 6/1936 | Mellinkoff | 29/890.121 |
| 3,204,930 | A * | 9/1965 | Bredtschneider et al. | 251/361 |
| 5,060,374 | A | 10/1991 | Findlanl et al. | |
| 5,139,042 | A | 8/1992 | Calhoun | |
| 5,697,342 | A | 12/1997 | Anderson et al. | |
| 6,469,271 | B1 * | 10/2002 | McGoey | 29/890.121 |
| 7,861,738 | B2 * | 1/2011 | Erbes | 137/15.08 |

* cited by examiner

*Primary Examiner* — Kevin Lee
(74) *Attorney, Agent, or Firm* — Liell & McNeil

(57) ABSTRACT

A process for remanufacturing valve bodies such as fuel injector valve bodies includes receiving a salvaged valve body having a first segment, a second segment and a middle segment which includes a valve seat and a guide bore for a valve therein. The process further includes removing material of the valve body where the valve seat and the guide bore are disposed, and positioning an insert within the valve body in place of the removed material. A new valve seat and a new guide bore are then machined in the insert, including locating for machining the new valve seat and new guide bore on a timing face of the valve body.

19 Claims, 4 Drawing Sheets

REMANUFACTURED MACHINE COMPONENT AND VALVE BODY REMANUFACTURING PROCESS

TECHNICAL FIELD

The present disclosure relates generally to the fields of remanufacturing and salvaging, and relates more particularly to a remanufacturing process where an insert is positioned in place of a valve seat and bore in a valve body, and a new valve seat and a new bore are machined in the insert.

BACKGROUND

The fields of salvaging and remanufacturing machine components have greatly expanded in recent years. Many parts which in the past would have been scrapped are now returned to service. Giving machine components further service life not only conserves resources, but also can create new revenue sources for manufacturers, machinists and mechanics. One challenge to successfully remanufacturing many parts is returning them to original specifications. In other words, it is typically desirable to remanufacture a part such that dimensions, operation, reliability, etc. are as close as practicable to those of a new part. In some instances, remanufactured parts may even be superior to new parts, as inspection and testing of individual remanufactured parts can often be more exacting than conventional analysis of many mass-produced new parts.

A unique set of challenges are associated with remanufacturing certain machine components used in hydraulic systems. Many modern hydraulic systems, such as internal combustion engine fuel systems, utilize rapidly moving valve components to control the timing, rate and other characteristics of fluid flow. Over the course of a fuel injector's service life, for example, its valve components may be required to actuate millions or even billions of times. The physical demands placed on such components will be readily apparent. When a fuel injector is to be remanufactured, certain functional surfaces of components of the fuel injector can be worn or otherwise damaged to the point that injector performance is compromised.

Valve seats within fuel injector valve bodies are one example of a functional surface which can be damaged from use, and ultimately affect fuel injector performance. Over time, a valve member striking a valve seat can deform the valve seat. Fluid flowing at relatively high pressure and relatively rapid fluid pressure changes can erode the valve seat and/or cause cavitation. U.S. Pat. No. 6,339,887 B1 to Straub et al. ("Straub") proposes one strategy for refurbishing a valve seat in a fuel injector assembly. In Straub, a tool is moved along a known reference axis to lap the valve seat. Lapping of the valve seat can presumably remove wear so that the associated component can be successfully returned to service. While Straub's approach might provide successful valve seat refurbishing in some instances, or for certain valve types, Straub and other known refurbishing strategies have various drawbacks. Many valve seats, and in particular the type used in fuel injectors, are typically made from hardened materials. It is common, however, for only the valve seat and material in the vicinity of the valve seat to be hardened. Apart from the hardened material in the vicinity of the valve seat, the component having the valve seat is often made from relatively softer material. This softer material may be unsuitable for use as a valve seat in a fuel injector's typical service environment. Thus, regrinding of the valve seat can remove the relatively hard material and expose softer material, rendering the fuel injector unsuitable for use. This can be especially problematic where hardened material has already been removed in a prior round of remanufacturing. Moreover, in some instances valve seat damage may be severe enough that regrinding cannot cure the problem without removing all of the hardened material.

SUMMARY

In one aspect, a process for remanufacturing valve bodies includes receiving a salvaged valve body having a first segment, a second segment and a middle segment. The middle segment includes a valve seat and defines a guide bore for a valve configured to contact the valve seat. The process further includes removing material of the valve body where the valve seat and the guide bore are disposed, and positioning an insert within the valve body in place of the removed material. The method still further includes machining a new valve seat in the insert and machining a new guide bore in the insert.

In another aspect, a remanufactured machine component includes a salvaged valve body having a first end and a second end, and further including a first segment terminating at the first end, a second segment terminating at the second end and a middle segment disposed between the first segment and the second segment which defines a pocket having an inner diameter. The remanufactured machine component further includes an insert having a valve seat, the insert being positioned within the pocket and having an outer diameter mated with the inner diameter of the pocket. The insert further defines a guide bore having an axis and being adapted for guiding a valve member movable between a first position contacting the valve seat and a second position at which the valve member does not contact the valve seat. The valve body further includes a timing face located on one of the first, second or third segments of the valve body, the timing face being oriented normal to the axis of the guide bore. The valve seat is spaced a predefined distance from the timing face to define at least in part a timing of a valve member guided via the guide bore.

In still another aspect, a valve body is remanufactured according to a process which includes receiving a salvaged valve body having a first segment, a second segment, and a middle segment, the middle segment including a valve seat and defining a guide bore for a valve configured to contact the valve seat. The process further includes removing material of the valve body where the valve seat and the guide bore are disposed, positioning an insert within the valve body in place of the removed material and machining a new valve seat and a new guide bore in the insert.

DETAILED DESCRIPTION

Figure 1:
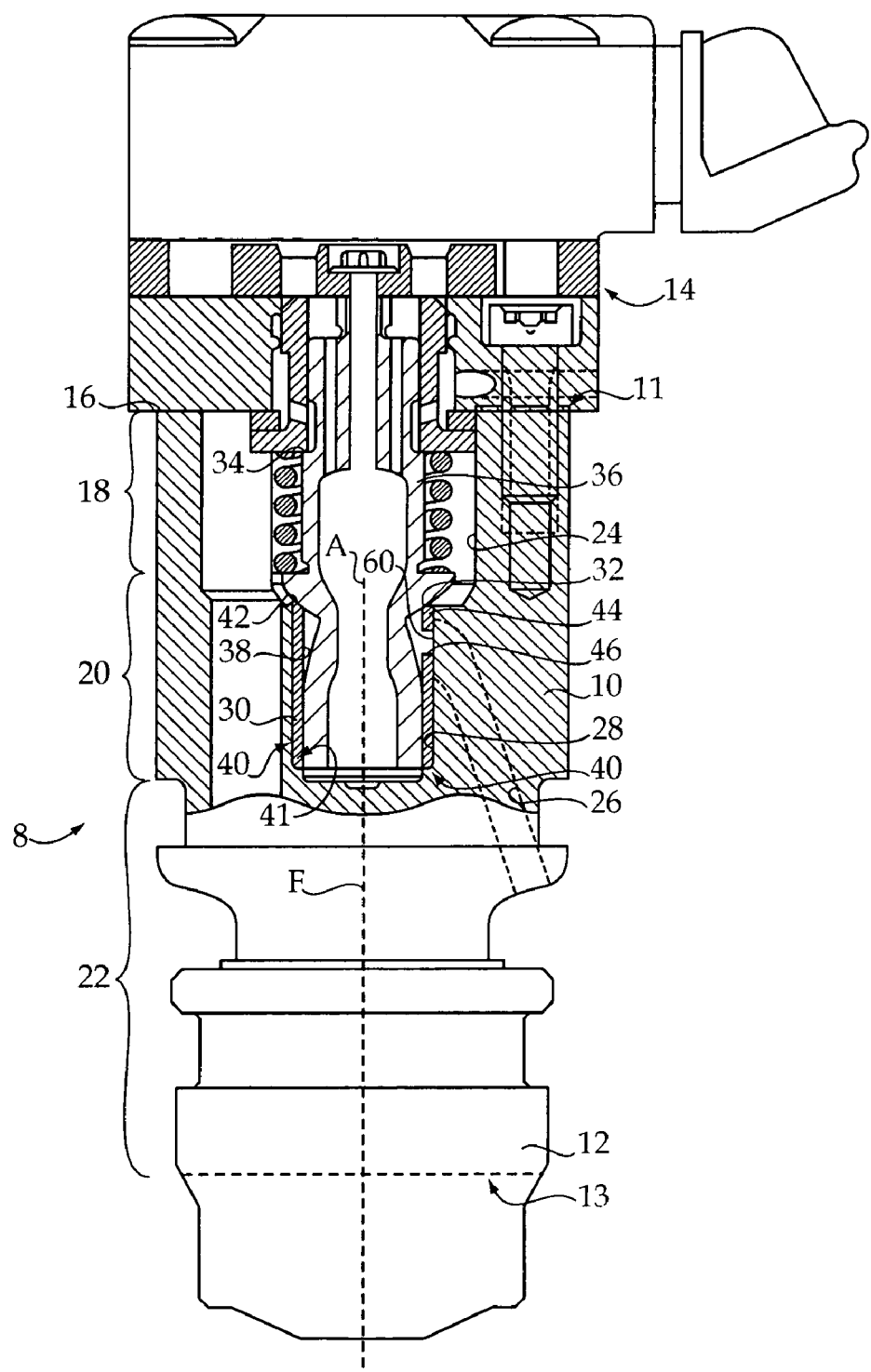
FIG. 1 is a partially sectioned side diagrammatic view of a portion of a remanufactured machine component according to one embodiment.

Referring to FIG. 1, there is shown a remanufactured machine component such as a fuel injector 8 according to one embodiment. Fuel injector 8 may include a plurality of coupled together body components, including a salvaged valve body 10, a second body component 12 and a third body component 14. Valve body 10 may comprise a control valve body and be coupled with body component 12 via threads, welding, or another suitable means. Valve body 10 may include a first end 11, and a second end 13 disposed within body component 12 and therefore shown in phantom in FIG. 1. Body component 14 may comprise an actuator subassembly mated with a timing face 16 disposed at first end 11. In one embodiment, body component 14 may comprise an electrical actuator (not shown) which is coupled with and configured to move a valve member 36 between a first position contacting a lower seat 32 and a second position at which valve member 36 does not contact lower seat 32, and contacts an upper seat 34. A guide bore 38 guides valve member 36 during moving between its respective positions. Moving of valve member 36 between seats 32 and 34 can allow fluid communications past seat 32 to be controlled in a conventional manner such that fuel or another actuation fluid may be supplied via an inlet passage 26 to other components of fuel injector 8. It should be nevertheless be appreciated that fuel injector 8 and other injectors described herein are not limited to any particular design or operating strategy. Moreover, while the present description is largely within the context of fuel systems, it should be appreciated that numerous other types of hydraulic systems and machine components are amenable to remanufacturing according to the teachings set forth herein.

Valve body 10 may include a plurality of segments, including a first segment 18, a second segment 22 and a middle segment 20 disposed between first segment 18 and second segment 22. First segment 18 may be understood as that part of valve body 10 which terminates at first end 11 and at valve seat 32. Middle segment 20 may be understood as that part of valve body 10 which extends approximately for a length of valve body 10 which is coextensive with a length of guide bore 38. Second segment 22 may terminate at second end 13 and at middle segment 20. The specific definitions of segments 12, 10 and 14 are used herein for illustrative purposes only. Although timing face 16 is shown positioned on first segment 18, in other embodiments a valve timing face may be disposed elsewhere on a valve body. As mentioned above, fuel injector 8 is remanufactured, meaning that at least certain of its components have been removed from service, disassembled, repaired, etc. as necessary, then reassembled for another service life. Valve body 10 may be one such remanufactured component. As discussed above, valve seats may become worn or otherwise damaged over time. In the case of valve body 10, a valve seat and valve guide bore have been removed from valve body 10 and a new valve seat 32 and valve guide bore 38 substituted for the removed valve seat and valve guide bore.

Figure 2:
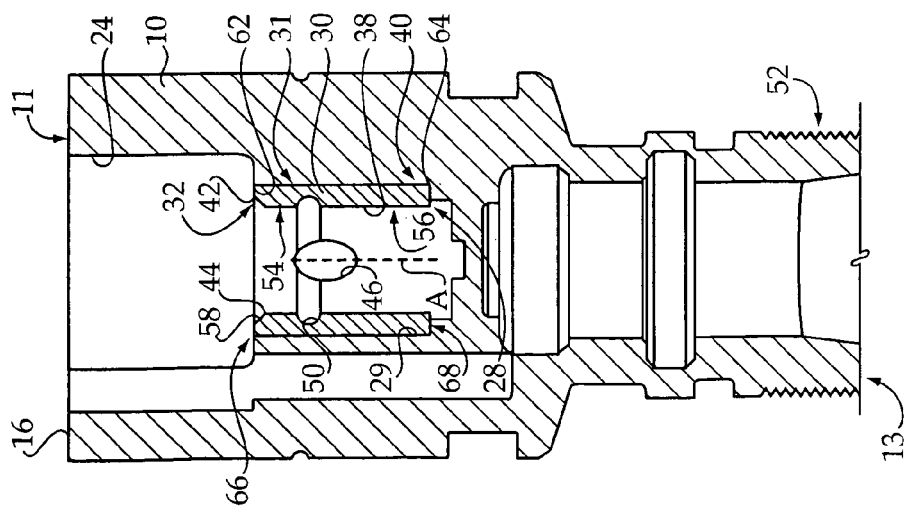
FIG. 2 is a sectioned side diagrammatic view of a remanufactured valve body according to one embodiment.

Referring also to FIG. 2, taken in a different section plane from that of FIG. 1, valve body 10 may include a cylindrical pocket 28 in middle segment 20 having an inner diameter 29. An insert 30 which includes seat 32 and guide bore 38 may be positioned in pocket 28. Insert 30 may comprise an outer diameter 40 which is mated with inner diameter 29 of pocket 28. Guide bore 38 may further have a longitudinal center axis A. In one embodiment axis A may be aligned with and/or partially coextensive with a longitudinal axis F of fuel injector 8, as shown in FIG. 1. Insert 30 may further be cylindrical and includes a first end 66 and a second end 68. Pocket 28 may also be cylindrical and also includes a first end 62 and a second end 64. Insert 30 may be press fit in pocket 28, having a press fit interface 31 with pocket 28. Pocket 28 has a length extending from first end 62 to the respective second end 64 which may be at least as great as a width of pocket 28. Insert 30 also has a length extending from first end 66 to second end 68 which may be at least as great as a width of insert 30. The widths of pocket 28 and insert 30 are defined as the dimensions of pocket 28 and insert 30 normal to their lengths. Press fit interface 31 may comprise at least a majority of the length of pocket 28 and at least a majority of the length of insert 30 to provide a robust mechanical coupling between insert 30 and valve body 10. In some embodiments, it may be desirable to fluidly seal along press fit interface 31, for example by applying a flowable curable sealant such as Loctite #603, available from numerous commercial sources. In other embodiments, press fit interface 31 may provide a sufficient fluid seal depending upon the application.

Insert 30 may be formed entirely of a hardened material, such as case hardened 52100 steel or another suitable material. The material of insert 30 will typically be harder than the material of which valve body 10 is formed. The use of hardened material for insert 30 is considered to provide suitable material for seat 32 in a typical fuel injector service environment. Since insert 30 may be formed entirely of hardened material, subsequent remanufacturing of valve body 10 may be possible, since regrinding seat 32 will not expose unhardened material, a problem associated with certain earlier strategies. Insert 30 may be hardened prior to press fitting in pocket 28, for example via heat treating in a furnace, etc. In other embodiments, the use of hardened material may not be considered necessary or even desirable.

It may further be noted that an orifice 46 may be formed in insert 30. One, or more than one, preformed orifice 46 may be provided which registers with a corresponding fluid inlet 60 to fluid passage 26. Inlet 60 and at least a portion of fluid passage 26 may be located in second segment 20. During press fitting insert 30 in pocket 28, insert 30 may be oriented such that orifice 46 registers with inlet 60 to provide fluid communications between passage 26 and guide bore 38. An annular recess or annulus 50 may further be formed in insert 30. Annulus 50 may also be preformed and provides fluid communication between orifice 46 and another orifice (not shown) connecting with another fluid passage (not shown). Annulus 50 may also serve as a feature with which an extractor device can be engaged to remove insert 30 from engagement with valve body 10, for instance for another round of remanufacturing by press fitting another insert into pocket 28. Guide bore 38 may include a first longitudinal section 54 which adjoins valve seat 32 and a second longitudinal section 56. Annulus 50 may be interposed longitudinal sections 54 and 56. In the illustrated embodiment valve seat 32 may comprise a conical valve seat having a first seat edge 44 which adjoins guide bore 38, a second seat edge 42 adjoining end 66 of insert 30, and a conical seat surface 58 extending from seat edge 42 to seat edge 44. Also shown in FIG. 2 is a set of external threads 52 located adjacent second end 13 for coupling valve body 10 with body component 12, or another body component.

Figure 3:
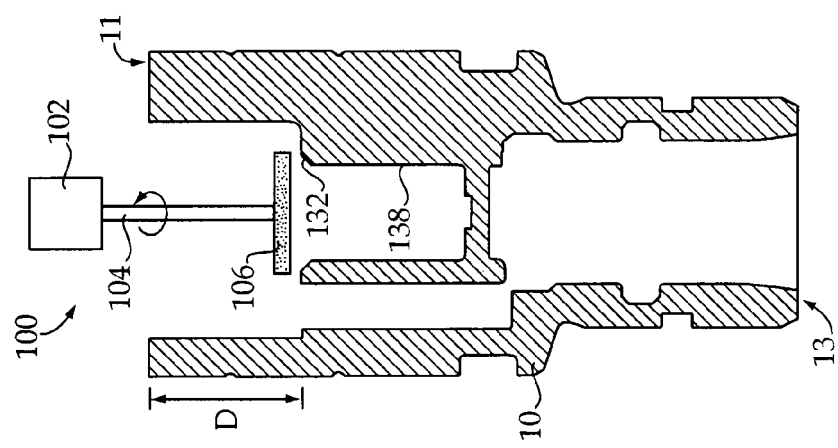
FIG. 3 is a sectioned side diagrammatic view of a valve body at one stage of a remanufacturing process, according to one embodiment.

Turning now to FIG. 3, the remanufacturing process of the present disclosure may begin by receiving a salvaged valve body such as valve body 10. Upon receipt of salvaged valve body 10, it may be inspected to determine whether it is amenable to remanufacturing according to the presently disclosed strategy, for example inspecting valve body 10 for relatively severe damage. If severely damaged, valve body 10 may be scrapped. In other instances, valve body 10 might be inspected to determine whether a remanufacturing process other than the one described herein might be preferred. Valve body 10 is illustrated in FIG. 3 with its original valve seat 132 and the original valve guide bore 138. A machining apparatus 100 such as a lathe or grinding apparatus is also shown. Apparatus 100 may include a housing or base 102 comprising a motor, a spindle 104 rotatable with the motor and a machining element 106. Apparatus 100 may be used to remove material of valve body 10 where valve seat 132 and guide bore 138 are disposed, for example by enlarging guide bore 138 along substantially an entirety of its length. A distance D is also illustrated in FIG. 3, identifying a valve timing distance between timing face 16 and valve seat 132. The distance between timing face 16 and valve seat 132 may define at least in part a timing of a valve member which moves between a position blocking seat 132 and another position not blocking 132, in a known manner. Distance D may be recorded and referenced later in the remanufacturing process, such that a new valve seat 32 may be positioned at the same valve timing distance from timing face 16.

Figure 4:
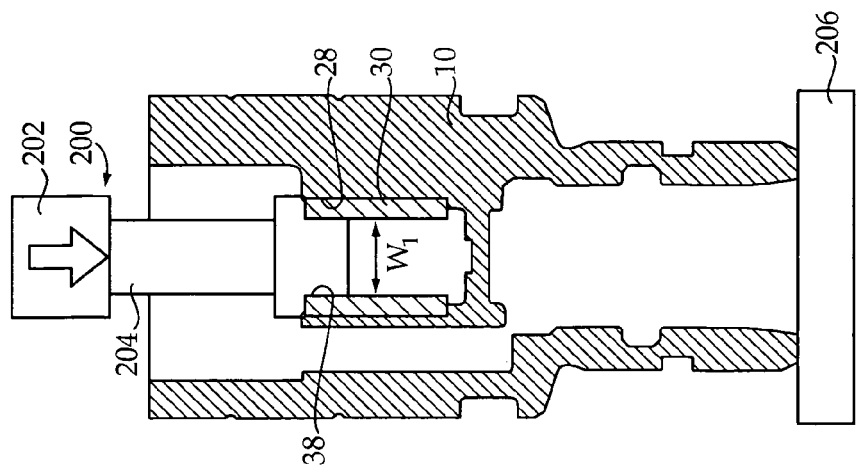
FIG. 4 is a sectioned side diagrammatic view of a valve body at another stage of a remanufacturing process, according to one embodiment.

Referring to FIG. 4, there is shown valve body 10 at another stage of a remanufacturing process subsequent to removing material via the process stage illustrated in FIG. 3. Removing material via the process stage illustrated in FIG. 3 forms pocket 28 in valve body 10. Once pocket 28 is formed in valve body 10, insert 30 may be press fit into pocket 28. A press 200 is shown in FIG. 4 having a force producing device 202 and a rod 204 which engages with insert 30. A reaction element 206 reacts the force applied via force producing device 202. It may be noted that insert 30 includes a preformed bore 38 therein. Bore 38 corresponds to guide bore 38 of insert 30 illustrated in FIGS. 1 and 2 and described above. Bore 38 will typically be formed in insert 30 with a width $W_1$ which is relatively less than a desired final width of bore 38, as will be further described herein. Insert 30 may also have other features preformed therein, such as annulus 50 and/or orifice 46. Insert 30 will typically not have a preformed valve seat, for reasons which will be apparent from the following description. Once insert 30 has been press fit in pocket 28, valve body 10 may be decoupled from press 200 and forwarded to another remanufacturing stage.

Figure 5:
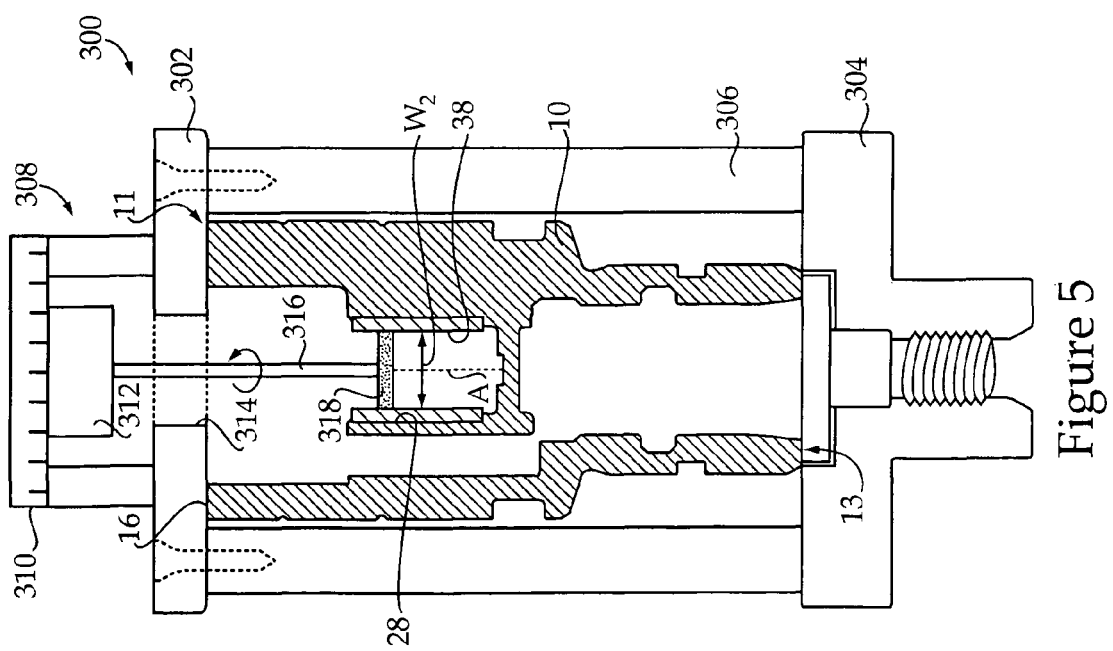
FIG. 5 is a sectioned side diagrammatic view of a valve body at yet another stage of a remanufacturing process, according to one embodiment.

Turning to FIG. 5, there valve body 10 is shown positioned in another machining apparatus, which may also be a grinding apparatus 300. Grinding apparatus 300 may include components purpose-built for machining insert 30 to form valve seat 32 and guide bore 38 to relatively tight tolerances. To this end, grinding apparatus 300 may include a locating element comprising a first fixture component 302 which contacts timing face 16 at first end 11, and a second fixture component 304 which contacts second end 13 of valve body 10. First fixture component 302 may be coupled with second fixture component 304 via a connector 306, such that valve body 10 is clamped between fixture components 302 and 304. Grinding apparatus 300 may further include a grinder 308 including a housing or base 312 having a motor and coupled with a rotatable spindle 316 having a grinding element 318 mounted thereon. In one embodiment, spindle 316 may extend through an aperture 314 in first fixture component 302.

Grinding apparatus 300 may further include a reference element 310, for example coupled with base 312 and with fixture component 302. Reference element 310 allows a grinding axis of grinding element 318, and the grinding axis of an additional grinding element to be described, to be located relative to one another, as further described herein. Grinding element 318 will typically be used to enlarge bore 38 to a width $W_2$ which is appropriate for guiding a valve member such as valve member 36 illustrated in FIG. 1. The grinding axis for grinding element 318 will typically define the center axis A of guide bore 38 when grinding element 318 enlarges bore 38. The grinding axis of grinding element 318 thus lies on axis A in FIG. 5.

Figure 6:
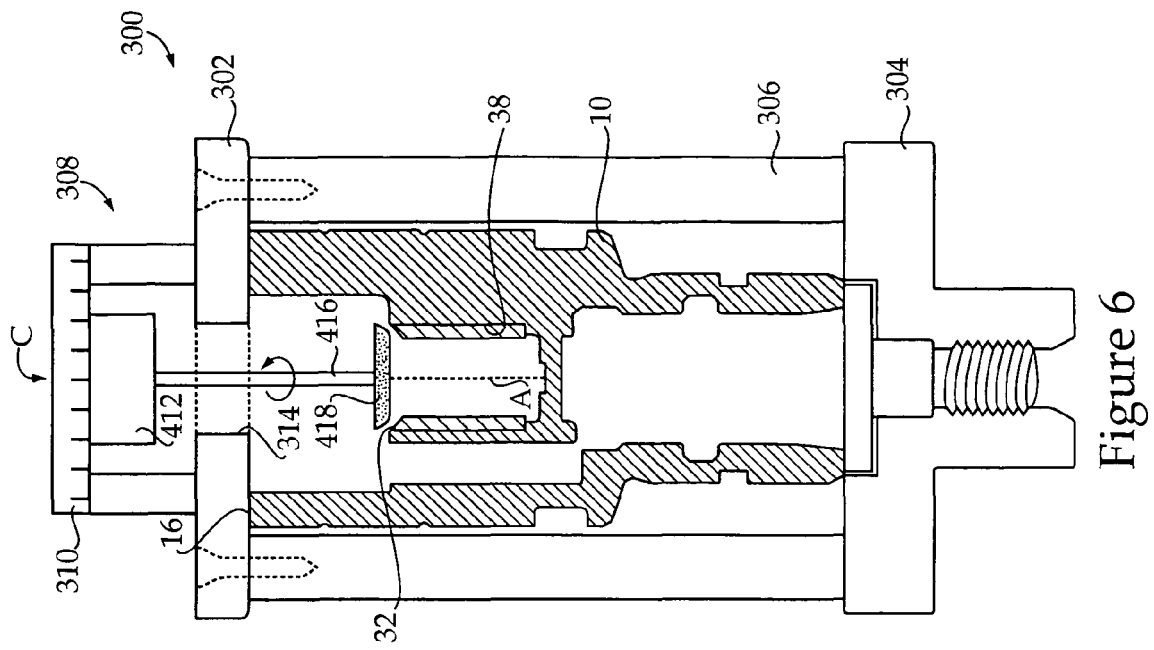
FIG. 6 is a sectioned side diagrammatic view of a valve body at yet another stage of a remanufacturing process, according to one embodiment.

Referring also to FIG. 6, there is shown valve body 10 at a subsequent stage of remanufacturing. Valve body 10 remains mounted in grinding apparatus 300, but a different set of grinder components may be used, including a base 412, a spindle 416 and another grinding element 418. Grinding element 418 may be used in grinding seat 32 in insert 30, and the grinding axis of grinding element 418 will typically define a center axis of valve seat 32. Both the grinding axis of element 418 and the center axis of valve seat 32 lie on axis A in FIG. 6. Thus, the grinding axes of each of grinding elements 318 and 418, and the center axes of valve seat 32 and bore 38 all lie on axis A or within a relatively close tolerance thereof. When grinding element 318 is used as in FIG. 5 to enlarge bore 38, reference element 310 may be used to locate the grinding axis of grinding element 318. When grinding element 418 is used as in FIG. 6 to grind seat 32, the grinding axis of grinding element 418 may also be located with reference element 310. When enlarging bore 38, grinding element 318 may have its grinding axis located on or close to a centerline of aperture 314, intersecting reference element 310 at a point C. When grinding seat 32, grinding element 418 may also have its grinding axis located on or close to the centerline of aperture 314.

Since valve body 10 is not decoupled from grinding apparatus 300 between the respective processing stages of FIGS. 5 and 6, the location of the grinding axes of elements 318 and 418 relative to one another can be set highly precisely. Thus, since locating of bore 38 and valve seat 32 is based on locating the grinding axes of grinding elements 318 and 418, bore 38 and valve seat 32 may also be located with high precision in valve body 10 relative to one another. In the embodiment shown, establishing of the location of the grinding axes of each of grinding elements 318 and 418 takes place by contacting timing face 16 with fixture component 302, or another locating element. In other words, timing face 16 may serve as a locating surface for machining bore 38 and seat 32, as the grinding axes of each of elements 318 and 418 may be set with grinding apparatus 300 while maintaining the contact between timing face 16 and fixture component 302.

Locating on timing face 16 also allows a depth of seat 32 within valve body 10 to be set at distance D. It will be recalled that the original seat 132 is spaced a valve timing distance from timing face 16. Since valve seat 32 is newly formed in valve body 10, it may be located at the valve timing distance D from timing face 16, as shown in FIG. 6. This obviates the need to regrind timing face 16 to compensate for a changed location relative to valve seat 32, as might be the case with certain known valve remanufacturing strategies where valve seats are reground. Once valve seat 32 has been ground, valve body 10 may be forwarded for final machining or inspection, testing, etc., and reassembled with other components for returning to service.

Figure 7:
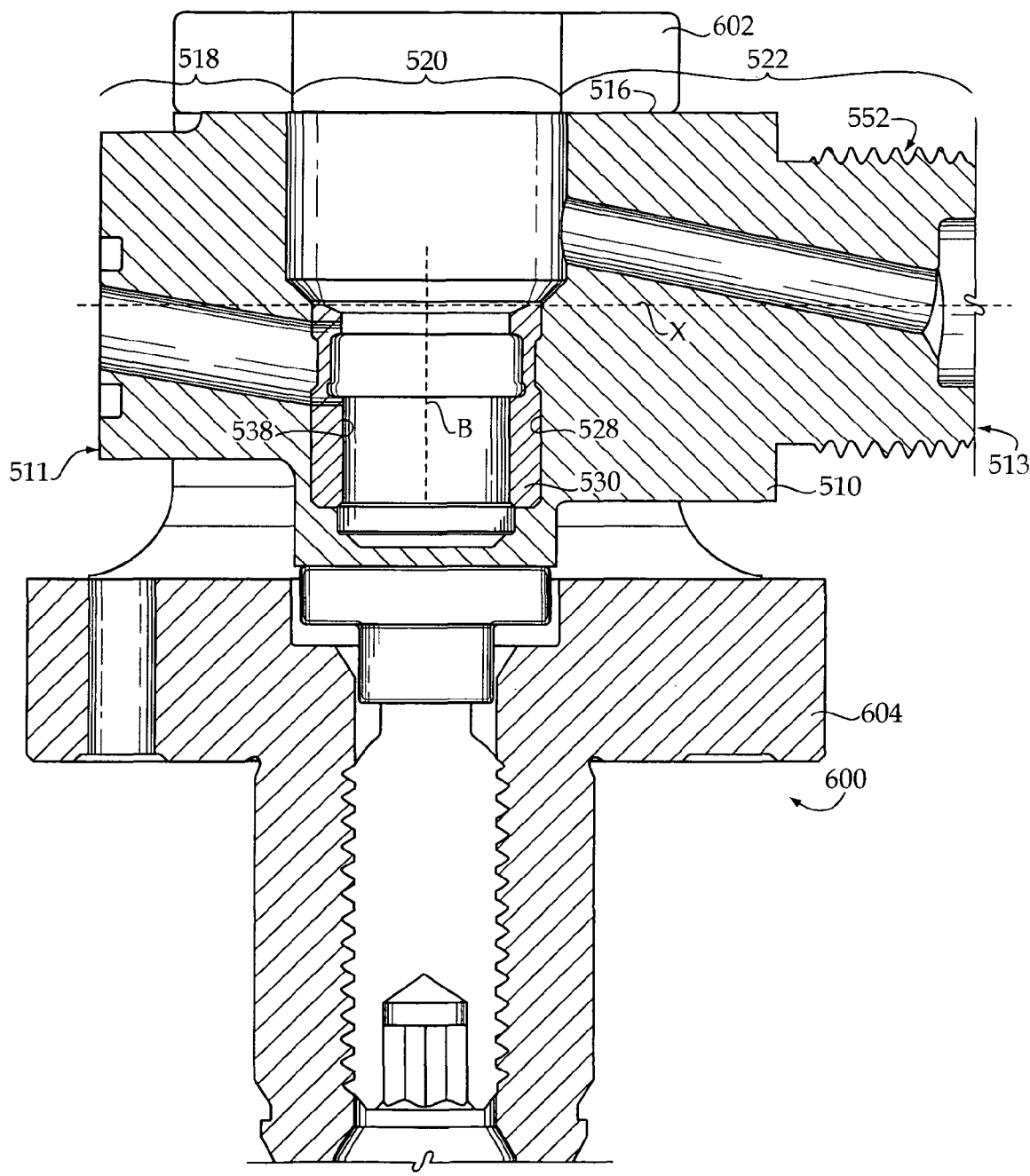
FIG. 7 is a sectioned side diagrammatic view of a valve body at one stage of a remanufacturing process, according to another embodiment.

Turning now to FIG. 7, there is shown a salvaged valve body 510 according to another embodiment coupled with a grinding apparatus 600. Valve body 510 has certain similarities with valve body 10, but several differences. Valve body 510 may include a first end 511, a second end 513 and a plurality of segments 518, 520 and 522 between its first and second ends 511 and 513. Threads 552 may be formed adjacent second end 513 to allow valve body 510 to be coupled with other machine components. Valve body 510 may serve purposes analogous to valve body 10 in connection with a fuel injector. Valve body 510 may further include an insert 530, similar to insert 30 described herein. Insert 530 may include a valve guide bore 538 and may be press fit within a pocket 528. Valve body 510 is shown clamped between a first fixture component 602 and a second fixture component 604, at a remanufacturing stage similar to that depicted in FIG. 5 in connection with valve body 10. Thus, a valve seat has not yet been formed in insert 530. Valve body 510 differs from valve body 10 primarily in the location of a timing face 516, and the orientation of bore 538. In the embodiment shown, timing face 516 is located on middle segment 520, and bore 538 has an axis B which is oriented transverse to a longitudinal axis x of valve body 510. Thus, when mounted in a fuel injector, axis B would be transverse, and possibly normal, to a longitudinal axis of the fuel injector.

INDUSTRIAL APPLICABILITY

Remanufacturing salvaged valve bodies in the manner described herein is considered to provide a number of advantages over state of the art strategies. For instance, valve bodies that would previously have been scrapped due to severe valve seat damage may be remanufactured, since a new valve seat is provided in the valve body. A related advantage is the ability to remanufacture valve bodies more times than was possible in the past. Many known remanufacturing strategies may be applied to a given valve body only once, or a small number of times, before the valve body cannot be further remanufactured without affecting its suitability for further service. Valve seats, however, are commonly the "Achilles' Heel" of certain hydraulic systems, as they tend to wear out substantially earlier than certain other features of a valve body. Thus, a valve body may be well suited to further service, except that its valve seat has reached the limit of the number of times it may be conventionally remanufactured. This limit may exist where further remanufacturing would expose softer material. This limit may also exist where a valve seat and timing face have been reground multiple times, and the valve body has been shortened to the point that performance, mounting, etc., of an associated machine component is affected.

Another advantage offered by the present disclosure which relates to further remanufacturing is the hardness of insert 30. As discussed above, insert 30 may be comprised entirely of hardened material. This means that insert 30 itself may be reground to remanufacture valve body 10 again once valve seat 32 wears out. By combining the present strategy of valve seat and bore replacement with regrinding of valve seat 32, valve body 10 may have many more potential service lives than that available with state of the art remanufacturing.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

We claim:

1. A process for remanufacturing machine components having a valve body comprising:
   receiving a salvaged valve body having a first segment, a second segment, and a middle segment, the middle segment comprising a valve seat and defining a guide bore for a valve configured to contact the valve seat;
   removing material of the valve body where the valve seat and the guide bore are disposed;
   positioning an insert within the valve body in place of the removed material;
   machining a new valve seat in the insert and machining a new guide bore in the insert; and
   positioning a valve member within the valve body such that the valve member is guided via the new guide bore between a first position at which the valve member contacts the new valve seat, and a second position at which the valve member does not contact the new valve seat.

2. The process of claim 1 wherein removing material further comprises forming a cylindrical pocket in the middle segment, and wherein positioning an insert within the valve body further comprises press fitting a cylindrical insert into the cylindrical pocket.

3. The process of claim 2 wherein machining a new guide bore further comprises enlarging a preformed bore of the insert.

4. The process of claim 3 wherein positioning an insert within the valve body comprises positioning an insert which defines at least one preformed orifice connecting with the preformed bore.

5. The process of claim 4 further comprising registering the at least one preformed orifice with an inlet to a fluid passage of the valve body during positioning the insert within the valve body.

6. The process of claim 4 wherein removing material comprises removing material having a relatively lesser hardness, and wherein positioning an insert within the valve body comprises positioning an insert within the valve body which has a relatively greater hardness, the process further comprising hardening the insert to the relatively greater hardness prior to positioning the insert within the valve body.

7. A process for remanufacturing valve bodies comprising:
   receiving a salvaged valve body having a first segment, a second segment, and a middle segment, the middle segment comprising a valve seat and defining a guide bore for a valve configured to contact the valve seat;
   removing material of the valve body where the valve seat and the guide bore are disposed;
   positioning an insert within the valve body in place of the removed material;
   machining a new valve seat in the insert and machining a new guide bore in the insert;
   wherein removing material further comprises forming a cylindrical pocket in the middle segment, and wherein positioning an insert within the valve body further comprises press fitting a cylindrical insert into the cylindrical pocket;
   wherein machining a new guide bore further comprises enlarging a preformed bore of the insert; and
   wherein machining a new guide bore comprises enlarging the preformed bore of the insert with a first grinding element, and wherein machining a new valve seat comprises machining the new valve seat with a second grinding element, subsequent to machining the new guide bore.

8. The process of claim 7 further comprising:
establishing a grinding axis for locating the first and second grinding elements during machining a new valve seat and machining a new guide bore at least in part by contacting a locating element of a grinding apparatus with a timing face of the valve body; and
locating the first and second grinding elements on the grinding axis by maintaining contact between the locating element and the timing face during machining a new valve seat and machining a new guide bore.

9. A process for remanufacturing valve bodies comprising:
receiving a salvaged valve body having a first segment, a second segment, and a middle segment, the middle segment comprising a valve seat and defining a guide bore for a valve configured to contact the valve seat;
removing material of the valve body where the valve seat and the guide bore are disposed;
positioning an insert within the valve body in place of the removed material;
machining a new valve seat in the insert and machining a new guide bore in the insert;
wherein:
receiving a salvaged valve body comprises receiving a salvaged valve body of a fuel injector, the salvaged valve body having a first end and a second end, and a timing face located on the first end which is spaced a valve timing distance from the valve seat; and
machining a new valve seat in the insert comprises locating the new valve seat at the valve timing distance from the timing face.

10. A remanufactured machine component comprising:
a salvaged valve body having a first end and a second end, and further including a first segment terminating at the first end, a second segment terminating at the second end and a middle segment disposed between the first segment and the second segment which defines a pocket having an inner diameter;
an insert which includes a valve seat, the insert being positioned within the pocket and having an outer diameter mated with the inner diameter of the pocket, and the insert further defining a guide bore having an axis and being adapted for guiding a valve member movable between a first position contacting the valve seat and a second position at which the valve member does not contact the valve seat;
wherein the valve body further includes a timing face located on one of the first, second or third segments of the valve body, the timing face being oriented normal to the axis of the guide bore, and the valve seat being spaced a predefined distance from the timing face to define at least in part a timing of a valve member guided via the guide bore.

11. The remanufactured machine component of claim 10 wherein the valve seat comprises a conical valve seat having a first seat edge adjoining the guide bore, a second seat edge adjoining an end of the insert and a conical seating surface extending from the first seat edge to the second seat edge.

12. The remanufactured machine component of claim 11 wherein the valve body includes at least one fluid inlet to a fluid passage, located in the second segment, and wherein the insert has an orifice registering with the at least one fluid inlet and fluidly connecting the fluid passage with the guide bore.

13. The remanufactured machine component of claim 12 wherein the guide bore includes a first longitudinal section adjoining the valve seat, a second longitudinal section and an annular recess interposed the first and second longitudinal sections.

14. The remanufactured machine component of claim 12 wherein:
the pocket has a first end, a second end, a width and a length extending from the first end of the pocket to the second end of the pocket which is at least as great as the width of the pocket;
the insert has a first end, a second end, a width and a length extending from the first end of the insert to the second end of the insert which is at least as great as the width of the insert; and
the insert and the pocket have a press fit interface therebetween which comprises at least a majority of the length of the pocket and at least a majority of the length of the insert.

15. The remanufactured machine component of claim 11 comprising a fuel injector which includes the valve body, the fuel injector further comprising a poppet valve member movable between the first position contacting the valve seat and the second position, and a control valve assembly coupled with the poppet valve member and mated to the timing face.

16. The remanufactured machine component of claim 15 wherein the valve body includes threads for mating the valve body with another component of the fuel injector.

17. The remanufactured machine component of claim 16 wherein the fuel injector includes a longitudinal axis, and wherein the axis of the guide bore in the valve body is oriented transverse to the longitudinal axis of the fuel injector.

18. The remanufactured machine component of claim 16 wherein the fuel injector includes a longitudinal axis, and wherein the axis of the guide bore in the valve body is aligned with the longitudinal axis of the fuel injector.

19. A valve body remanufactured according to a process comprising:
receiving a salvaged valve body having a first segment, a second segment, and a middle segment, the middle segment comprising a valve seat and defining a guide bore for a valve configured to contact the valve seat;
removing material of the valve body where the valve seat and the guide bore are disposed;
positioning an insert within the valve body in place of the removed material; and
machining a new valve seat and a new guide bore in the insert;
wherein:
machining a new guide bore comprises enlarging a preformed bore of the insert with a first grinding element located via a grinding axis, then machining the new valve seat with a second grinding element also located via the grinding axis; and
the process further comprises establishing the grinding axis for locating the first and second elements at least in part by contacting a locating element of a grinding apparatus with a timing face of the valve body, and maintaining contact between the locating element and the timing face during machining a new valve seat and machining a new guide bore.

* * * * *

UNITED STATES PATENT AND TRADEMARK OFFICE
CERTIFICATE OF CORRECTION

PATENT NO.       : 8,291,927 B2                                      Page 1 of 1
APPLICATION NO.  : 12/072892
DATED            : October 23, 2012
INVENTOR(S)      : Johnson et al.

It is certified that error appears in the above-identified patent and that said Letters Patent is hereby corrected as shown below:

In the Claims

Column 10, line 56, in Claim 19, delete "second elements" and insert -- second grinding elements --.

Signed and Sealed this
Eighteenth Day of August, 2015

Michelle K. Lee
*Director of the United States Patent and Trademark Office*